US012596199B2

(12) United States Patent
Helms et al.

(10) Patent No.: US 12,596,199 B2
(45) Date of Patent: Apr. 7, 2026

(54) GPS BASED LOCATION DETERMINATION USING ACCURATELY MAPPED POLYGONAL AREAS

(71) Applicant: Radius Networks, Inc., Washington, DC (US)

(72) Inventors: David Helms, Arlington, VA (US);
Marc Wallace, Arlington, VA (US);
Scott Yoder, Washington, DC (US);
Christopher Sexton, McLean, VA (US)

(73) Assignee: Radius Networks, Inc., Washington, DC (US)

( * ) Notice: Subject to any disclaimer, the term of this patent is extended or adjusted under 35 U.S.C. 154(b) by 116 days.

(21) Appl. No.: 18/350,156

(22) Filed: Jul. 11, 2023

(65) Prior Publication Data

US 2024/0012159 A1     Jan. 11, 2024

Related U.S. Application Data

(63) Continuation of application No. 16/879,537, filed on May 20, 2020, now Pat. No. 11,740,366.

(51) Int. Cl.
*G01S 19/40* (2010.01)
*G01S 19/51* (2010.01)
*G01S 19/52* (2010.01)

(52) U.S. Cl.
CPC .............. *G01S 19/40* (2013.01); *G01S 19/51* (2013.01); *G01S 19/52* (2013.01)

(58) Field of Classification Search
CPC ........ G01S 19/40; G01S 19/51; H04W 4/021; H04W 4/029
See application file for complete search history.

(56) References Cited

U.S. PATENT DOCUMENTS 9,772,193 B1 *  9/2017  Mendelson ........... H04W 76/50
9,952,049 B2 *  4/2018  Zhang .................. G01C 21/165
(Continued)

FOREIGN PATENT DOCUMENTS

WO      WO2022272242 A1   12/2022

OTHER PUBLICATIONS

Office Action for U.S. Appl. No. 18/497,486, mailed on Jan. 16, 2025, Judkins, "Systems and Methods for Machine-Learning Optimization for Estimated Time of Arrival Analysis", 34 Pages.
Office Action for U.S. Appl. No. 18/391,622, dated Feb. 4, 2025, 27 Pages.
Search Report and Written Opinion for International Application No. PCT/US2024/053015, Dated Feb. 7, 2025, 14 pages.
(Continued)

*Primary Examiner* — Scott A Browne
*Assistant Examiner* — Josephine Elizabeth Rich
(74) *Attorney, Agent, or Firm* — Lee & Hayes, P.C.

(57) ABSTRACT

GPS-based position reporting suffers from probabilistic error. The system and methods discussed herein reduce uncertainty by mapping a geometric figure that encompasses a GPS-based reported location and that bounds corresponding predetermined-as-more-probable true locations (MPTL's) among possible locations for the source of the reported location. The mapped figure is overlaid on a relatively accurate mapping of substantially adjacent polygonal areas. Areas of overlap are used for picking among the areas, the polygonal area most likely to be occupied by the source. In one embodiment, the polygonal areas are closely packed parking spots in a parking lot, garage or other like structure, the source is a customer's mobile phone and an attendant is tasked with quickly delivering ordered goods to the customer's parking spot.

20 Claims, 6 Drawing Sheets

(56)　　　　References Cited

U.S. PATENT DOCUMENTS

| 10,921,147 | B1 | 2/2021 | Hapgood et al. | |
| 11,521,161 | B2 | 12/2022 | Zhang et al. | |
| 2008/0280624 | A1* | 11/2008 | Wrappe | G01S 5/0036 |
| | | | | 455/456.1 |
| 2010/0324959 | A1 | 12/2010 | Templeton et al. | |
| 2013/0069823 | A1 | 3/2013 | van Diggelen | |
| 2013/0132231 | A1 | 5/2013 | Teudt | |
| 2014/0074743 | A1 | 3/2014 | Rademaker | |
| 2014/0180959 | A1 | 6/2014 | Gillen | |
| 2014/0222570 | A1 | 8/2014 | Devolites et al. | |
| 2015/0081362 | A1 | 3/2015 | Chadwick et al. | |
| 2015/0302495 | A1 | 10/2015 | Stuckman et al. | |
| 2015/0347937 | A1 | 12/2015 | Arlitt et al. | |
| 2015/0359127 | A1 | 12/2015 | Daoura et al. | |
| 2016/0063435 | A1 | 3/2016 | Shah et al. | |
| 2016/0068264 | A1 | 3/2016 | Ganesh et al. | |
| 2016/0078397 | A1 | 3/2016 | Barton et al. | |
| 2019/0385121 | A1 | 12/2019 | Waliany et al. | |
| 2020/0167722 | A1 | 5/2020 | Goldberg | |
| 2020/0242553 | A1 | 7/2020 | Zhang et al. | |
| 2020/0250737 | A1 | 8/2020 | Wallace et al. | |
| 2021/0065107 | A1 | 3/2021 | Jajula | |
| 2021/0216959 | A1* | 7/2021 | Hapgood | H04W 4/021 |
| 2021/0364651 | A1 | 11/2021 | Helms et al. | |
| 2022/0051183 | A1 | 2/2022 | Franzo | |
| 2025/0139570 | A1 | 5/2025 | Judkins | |
| 2025/0209412 | A1 | 6/2025 | Rademaker | |
| 2025/0285166 | A1 | 9/2025 | Lee | |

OTHER PUBLICATIONS

Office Action for U.S. Appl. No. 16/879,537, mailed on Feb. 13, 2023, Inventor #1 David Helms, "GPS Based Location Determination Using Accurately Mapped Polygonal Areas", 16 pages.
PCT Search Report and Written Opinion mailed Aug. 24, 2021 for PCT Application No. PCT/US21/33175, 12 pages.
Office Action for U.S. Appl. No. 18/391,622, mailed on Jun. 11, 2024, Rademaker, "Systems and Methods for Determining a Location of a Computing Device", 24 Pages.
Office Action for U.S. Appl. No. 18/497,486, mailed on Jun. 13, 2024, Judkins, "Systems and Methods for Machine-Learning Optimization for Estimated Time of Arrival Analysis", 27 pages.
Office Action for U.S. Appl. No. 18/391,622, mailed on Sep. 9, 2024, Rademaker, "Systems and Methods for Determining a Location of a Computing Device", 28 Pages.
Bhattacharya, Wrishin, "Expected Time of Arrival Predictor," Apr. 9, 2023, Linked In, pp. 1-6. https://www.linkedin.com/pulse/ expected-ti me-arrival-predictor-wrishin-bhattacharya#:-:text= Machi ne%20 Learning %20 Mode Is %20for %20 Et A, %2C%2otraffic%2C% 20and%20weather%20conditions. (Year: 2023) 6 pages.
Hu. Xinyu et al., "DeeprETA: An ETA Post-processing System at Scale," Jun. 5, 2022, Uber Technologies Inc., pp. 1-9. https://arxiv. org/pdf/2206.02127. (Year: 2022) 23 pages.
Office Action for U.S. Appl. No. 18/497,486, dated Apr. 28, 2025, 22 Pages.
Office Action for U.S. Appl. No. 18/391,622, dated Jun. 11, 2025, 29 Pages.
Office Action for U.S. Appl. No. 18/391,622, dated Nov. 18, 2025, 28 Pages.

* cited by examiner

201

300

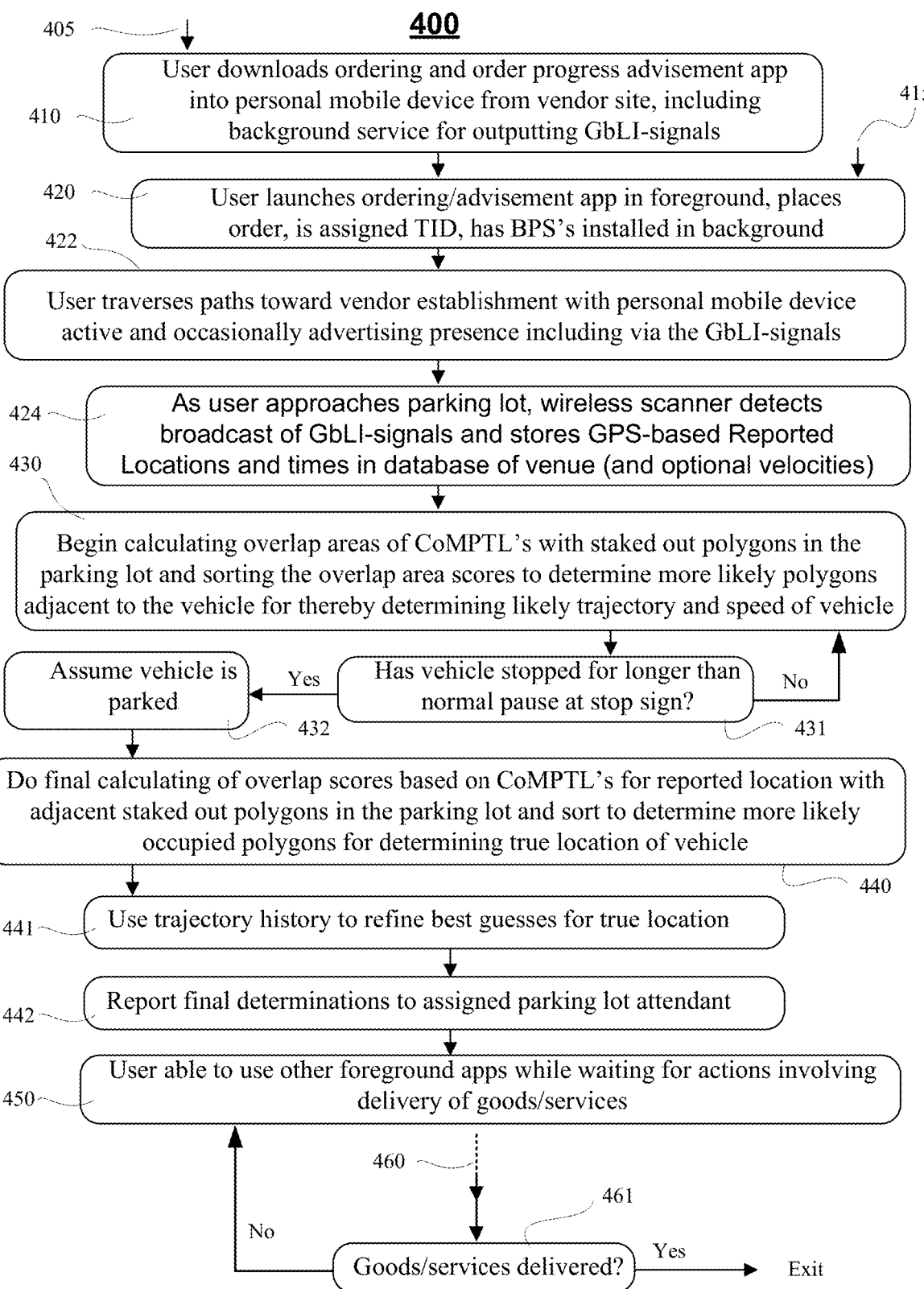

400

405

410 — User downloads ordering and order progress advisement app into personal mobile device from vendor site, including background service for outputting GbLI-signals

415

420 — User launches ordering/advisement app in foreground, places order, is assigned TID, has BPS's installed in background 422 — User traverses paths toward vendor establishment with personal mobile device active and occasionally advertising presence including via the GbLI-signals 424 — As user approaches parking lot, wireless scanner detects broadcast of GbLI-signals and stores GPS-based Reported Locations and times in database of venue (and optional velocities)

430 — Begin calculating overlap areas of CoMPTL's with staked out polygons in the parking lot and sorting the overlap area scores to determine more likely polygons adjacent to the vehicle for thereby determining likely trajectory and speed of vehicle Assume vehicle is parked    Yes ← Has vehicle stopped for longer than normal pause at stop sign?    No 432    431

Do final calculating of overlap scores based on CoMPTL's for reported location with adjacent staked out polygons in the parking lot and sort to determine more likely occupied polygons for determining true location of vehicle

440

441 — Use trajectory history to refine best guesses for true location

442 — Report final determinations to assigned parking lot attendant

450 — User able to use other foreground apps while waiting for actions involving delivery of goods/services

460

461

No

Goods/services delivered?    Yes → Exit

FIG. 4

GPS BASED LOCATION DETERMINATION USING ACCURATELY MAPPED POLYGONAL AREAS

CROSS REFERENCE

This application is a continuation of and claims priority to commonly assigned, co-pending U.S. patent application Ser. No. 16/879,537, filed May 20, 2020. Application Ser. No. 16/879,537 is fully incorporated herein by reference.

The disclosures of the following US applications are incorporated herein by reference in their entireties: (1) U.S. Provisional Application No. 62/453,872, filed Feb. 2, 2017; (2) U.S. patent application Ser. No. 15/884,132, filed Jan. 30, 2018 originally entitled "WIRELESS LOCATOR SYSTEM", now U.S. Pat. No. 10,531,229 and issued Jan. 7, 2020, and claiming priority to said Provisional Application No. 62/453,872; (3) U.S. patent application Ser. No. 16/232, 849 filed Dec. 26, 2018 originally entitled LOCAL EPHEMERAL LOCATION TRACKING OF MOBILE DEVICE USERS, now U.S. Pat. No. 10,484,831 and issued Nov. 19, 2019; (4) U.S. patent application Ser. No. 16/265,786 filed Feb. 1, 2019 originally entitled "Location Sensitive Queues Management", now U.S. Pat. No. 11,532,032 and issued Dec. 20, 2022; and (5) U.S. patent application Ser. No. 16/725,262 filed Dec. 23, 2019 originally entitled "High Confidence Isolated Presence Detection In Fine Resolution Region", now U.S. Pat. No. 11,609,319 and issued Mar. 21, 2023.

BACKGROUND

There is a growing demand for customer-centric online order and appointment/reservation processing as well as to timely servicing of on-premise customers. Providers who are asked to provide requested goods and/or services in timely and high quality manner to online requestors and on-premise customers and to respect appointments or reservations or expectations of or for the same often have to cope with surges and ebbs in volume of arriving orders/appointments and variations in resources at hand for satisfying customer/patron requests as well as coping with fluctuating flows of patron traffic in, out of and/or adjacent to their establishments. It is valuable to know when a customer arrives and where the customer is. Customer relations may suffer if an arriving or arrived patron is made to wait for unexpected long times, asked to accept inferior servicing or has his/her order mixed up with that of another.

By way of a nonlimiting example, a fast food restaurant may offer a pre-order feature where customers pre-order their desired items online and then drive to a designated curbside pick up spot or a designated parking spot at which the customers can expect their ordered items to be ready for immediate or almost immediate (e.g., less than 5 minute wait time) pick up. If customers are made to wait too long at the respective pick-up areas or if their orders get mixed up with those of others, they may become discouraged and not return to the establishment in the future.

It is to be understood that some concepts, ideas and problem recognitions provided in this description of the Background may be novel rather than part of the prior art.

BRIEF SUMMARY

GPS-based position reporting suffers from probabilistic error. Uncertainty is reduced in accordance with the present disclosure by mapping a geometric figure that encompasses a GPS-based reported location and that bounds corresponding predetermined-as-more-probable true locations (MPTL's) among possible locations for the source of the reported location. The mapped figure is overlaid on a relatively accurate mapping of substantially adjacent polygonal areas. Areas of overlap are used for picking among the areas, the polygonal area most likely to be occupied by the source. In one embodiment, the polygonal areas are closely packed parking spots in a parking lot, garage or other like structure, the source is a customer's mobile phone and an attendant is tasked with quickly and correctly delivering ordered goods to the customer's parking spot.

In one embodiment, there is provided a machine-implemented method of providing improved GPS-based determination that a specific GPS-based position reporting device is located in a specific one of substantially adjacent polygonal areas (e.g., densely packed parking spots in a parking lot, garage or other like structure). The method comprises: (a) receiving a GPS-based Location-reporting and ID-reporting Signal (GbLIS) pushed an/or pulled from a specific GPS-based position reporting device and extracting a respective GPS-based reported location from the received GbLIS; (b) positioning a mapping of the reported location on a pre-established mapping of the substantially adjacent polygonal areas and generating from the on-map positioning of the reported location, an on-map bounded geometric figure (e.g., a circle) that encompasses the mapped reported location and bounds on the mapping, corresponding predetermined as more probable true locations (MPTL's) among possible locations for the position reporting device; (c) determining respective overlaps of the on-map bounded geometric figure with respective ones of the mapped polygonal areas; (d) using respective overlap areas of the on-map bounded geometric figure with respective ones of the mapped polygonal areas while excluding non-overlap areas to generate respective overlap scores indicative of which of the mapped polygonal areas are likely to encompass more of the MPTL's than others of the mapped polygonal areas; (e) identifying a subset of the mapped polygonal areas that have significantly higher overlap scores than others of the substantially adjacent polygonal areas; and reporting part or all of the identified subset as constituting likely candidates for where the reporting device is located.

In one embodiment, the identifying of the subset of the mapped polygonal areas that have significantly higher overlap scores includes applying a filter to the generated respective overlap scores to thereby eliminate from further consideration, those of the generated overlap scores that do not satisfy predetermined significance criteria. In one embodiment, the predetermined significance criteria includes requiring the respective overlap score to be equal to or greater than a predetermined fraction (e.g., 10%-20%) of a maximum overlap score that can be generated for the respective polygonal area.

In one embodiment, there is provided a machine system that comprises: (a) a receiver configured to receive transmitted GbLI-signals (GPS-based Location-reporting and ID-reporting signals) wirelessly sourced (e.g., via radio, optical and/or acoustic transmission) from a GPS position reporting device disposed in a specific one of plural and substantially adjacent polygonal areas; (b) a digital storage configured to store therein, respective digital representations of the GPS-based reported locations and specific identifications of the respective sources obtained from the received GbLI-signals; (c) a mapper having stored therein a mapping of the substantially adjacent polygonal areas including the polygonal area occupied by the reporting device, the mapper being configured to map one of the respective digital representations of the GPS-based reported locations onto the mapping and to generate therefrom an on-map bounded geometric figure that encompasses the mapped reported location and that bounds on the mapping, corresponding predetermined as more probable true locations (MPTL's) among possible locations for the reporting device while excluding predetermined as less probable ones among the possible locations; (d) an overlap scores generator, operatively coupled to the mapper and configured to generate overlap scores respectively associated with overlaps of the on-map bounded geometric figure with the on-map representations of the substantially adjacent polygonal areas; (e) a sorter, operatively coupled to the overlap scores generator and configured to sort the generated overlap scores according to value; and (f) a reporter, operatively coupled to the sorter and configured to output a report that identifies a highest scoring one or a highest scoring subset of the polygonal areas.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIG. 4 is a flow chart of a tracking method that uses overlap of GPS probable error range with sub-areas of pre-mapped parking spots for automatically determining approach and final arrival to a designated parking spot (or other accurately mapped polygonal area) by a vehicle having a respective GPS position reporting device.

DETAILED DESCRIPTION

Figure 1:
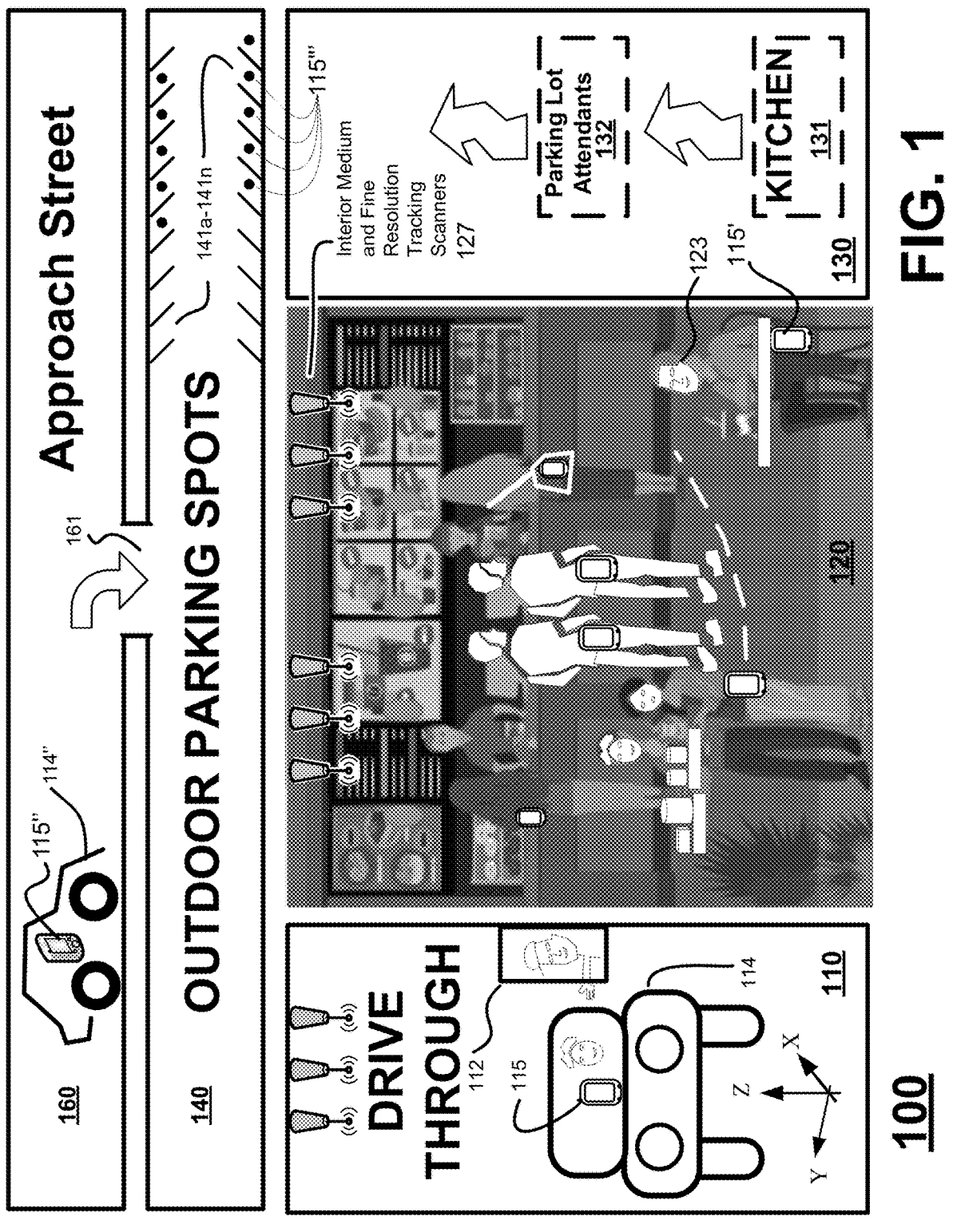
FIG. 1 is a schematic diagram of an environment in which high confidence presence detection and location determination can be desirable despite over-time variations in GPS position reporting accuracy.

The disclosure relates to technology using resources of wireless networks and personal mobile communicators to detect arrivals and respective parked locations of expecting recipients of goods and/or services. Some embodiments disclosed here provide improved confidence for determined location near or within a designated parking spot (an example of an accurately pre-mapped polygonal area) by a vehicle having a respective GPS-based position reporting device that repeatedly transmits (on an automatically pushed basis and/or on a request-activated pull basis) a GPS-based Location-reporting and ID-reporting Signal (hereafter "GbLIS" and also "GbLI-signal").

Variations in signal transmission and receipt factors (e.g., noise, reflections) can lead to significant error in GPS-based location reporting. The error between reported location (Rep'd_Loc) and true location (TL) of the GPS-based position reporting device can be as large as 10 to 20 meters or even larger. In one set of embodiments, a first Circular region Of predetermined-as More Probable Errors (CoMPE's) can be defined as having the GPS-based position reporting device's true location at its center and as having within the circumscribing perimeter of that circle about 95% to 99.7% (respectively, 1-sigma, 2-sigma) of the more often (more probable) reported locations out of all reported locations as measured by sampling over a pre-specified time duration (e.g., over a 24 hour duration). The sampling-generated reported locations (Rep'd_Loc's) will include normal probabilistic deviations (true location plus normal errors; e.g., Gaussian distributed error amounts and error directions) and they will also include outlier less-often (less-probable) reported locations that are excluded from that first circle (from the CoMPE's—not shown).

Conversely, when a GPS-based position reporting device reports its position, a second circular region (CoMPTL's— see briefly, FIG. 2B) can be defined as having the reported location (Rep'd_Loc) at its center and as bounding the set of predetermined as more often (as more probable) true locations (e.g., MPTL's within the 95%-99.7% probability or occurrence range) disposed within its circumference while outliers (anomalies) are excluded. Each instance of a predetermined true location equals reported location minus the associated measured error for that sampling-generated reported location and for that time of report. It is within the contemplation of the present disclosure to use less stringent encapsulation of the more probable reported locations such as the more probable 68% (1 sigma on the Gaussian distribution graph) of all statistical samplings. The encapsulation of the predetermined-as-more probable reported locations should contain at least more than 50% of the closest sampling-generated reported locations (Rep'd_Loc's) relative to the corresponding true location (TL). In other words: True_Loc=Rep'd_Loc–Reporting_Error and the predetermined as More Probable True Locations (MPTL's) are the greater than 50% of the closest of the statistical samplings for the given true location (TL) as taken over the predetermined time duration (e.g., 72 hour sampling window). The error (Err) in the GPS-based reported location (Rep'd_Loc) can be due to one or more factors such as for example, interference from ambient noise, wave distortion from current weather conditions (e.g., rain), the current disposition of a constellation of in-line-of-sight GPS satellites relative to the GPS-based position reporting device and/or due to reflected GPS signals.

The associated, relatively wide and current Circle of predetermined as More Probable True Locations (CoMPTL's, e.g., encompassing circle that can have a radius of 10-20 meters or larger as measured from the reported location (Rep'd_Loc)) can lead to significant uncertainty about where the GPS position reporting device (e.g., 215' of FIG. 2B) is truly located when it is not possible to see that reporting device. Ideally, the provider of requested goods and/or services would like to timely deliver the customer's requested goods/services to the correct parking position (or other pre-mapped polygonal area) almost immediately after the customer has arrived and without calling the customer and embarrassingly asking, "Where are you?". But given a CoMPTL's circle that can reasonably have a radius of 10-20 meters or larger and given the normal width of a conventional parking spot being about 2.65 meters (average minimum width in the U.S.A.), the true location (True_Loc or TL for short) can be any of about 15 parking spots (assuming cars can park close together in a head to head as well as close side by side configuration) this can be a problem. When the parking lot is crowded, the provider may be left reasonably unsure as to which parking spot is the correct one to be receiving the pre-ordered goods/services. The provider might try to call the recipient's phone and ask, "Where are you?". However, it can be problematic for a customer to explain where exactly he or she is when in an unfamiliar parking lot, garage or other such structure. Moreover, the customer might be talking at the time with someone else on his/her phone and the provider will just get a busy signal. A better solution would be desirable.

In one embodiment, a mobile wireless device normally or routinely carried by the recipient (e.g., the recipient's smartphone, smart watch or other such routinely carried or worn mobile communication device) is used as a remote GPS-based position reporting device (and optionally also as a velocity reporting device) for keeping track of the location of the recipient (and optionally for also keeping track of the velocity of the recipient). In particular, the mobile wireless device is used to determine better than 50% likelihood of presence and stoppage of the recipient in an accurately pre-mapped polygonal area such as a specific parking spot. The GPS-based position reporting device automatically transmits on an automatically pushed and/or request-pulled basis, a GPS-based Location-reporting and ID-reporting radio Signal ("GbLIS", also denoted herein as ""GbLI-signal") that provides a current location report based on GPS position determining and also provides a unique identification of the reporting device and/or a unique identification of the possessor of the device and/or of a transaction associated with the device or its possessor. Optionally, the GbLI-signal may also regularly or from time to time include velocity or acceleration reporting information (e.g., based on an in-device accelerometer). In one embodiment, the wirelessly transmitted GbLIS's are output in response to wireless request signals for the respective GbLIS's (pull signals) as sent from the report receiving and analyzing system. In the same or an alternate embodiment, the wirelessly transmitted GbLIS's are automatically output as push signals without need for request signals from the report receiving and analyzing system.

To compensate for uncertainty as to where the true location (TL) is because of the size of the CoMPTL's circle currently surrounding the reported location, a list of Even-More Probable True Locations (EMPTL's) is generated by overlapping a mapping of the CoMPTL's circle on top of a mapping of accurately located polygonal areas that are known to be true parking spots. The on-map overlap area in each polygonal area is taken as representative of the relative probability that the recipient is parked in that parking spot. The listing of EMPTL's (Even-More Probable True Locations) is numerically sorted to identify the parking spot (or other polygonal area) having the highest relative probability and then the next highest relative probability and so on. In essence, those of the more-probable true locations (MTL's) that place the recipient's GPS position reporting device outside of true parking spots are taken out of the equation. EMPTL's=All_MPTL's minus MPTL's_Not_Inside_A_Polygon. This elimination of unreasonable MPTL's improves the chance that only the more reasonable ones of predetermined-as-probable true locations (better MPTL's) will be listed. The listing can be combined with other recorded information (e.g., the vehicle's probable trajectory shortly before stopping in a parking spot) to increase the likelihood that the correct parking spot will be identified as the most probable one where the recipient is waiting for his/her pre-ordered goods/services. In one embodiment, a filter is applied to an initial listing of the EMPTL's by removing those overlaps that fail to satisfy a minimum overlap (or minimum overlap score) criteria. For example, in one embodiment, the minimum overlap is at least 10% to 20% of the respective polygonal area.

Figure 2A:
FIG. 2A is a schematic illustrating a GPS-based position reporting device (e.g., smart cell phone) disposed in part of a pre-mapped parking spot.
Figure 2B:
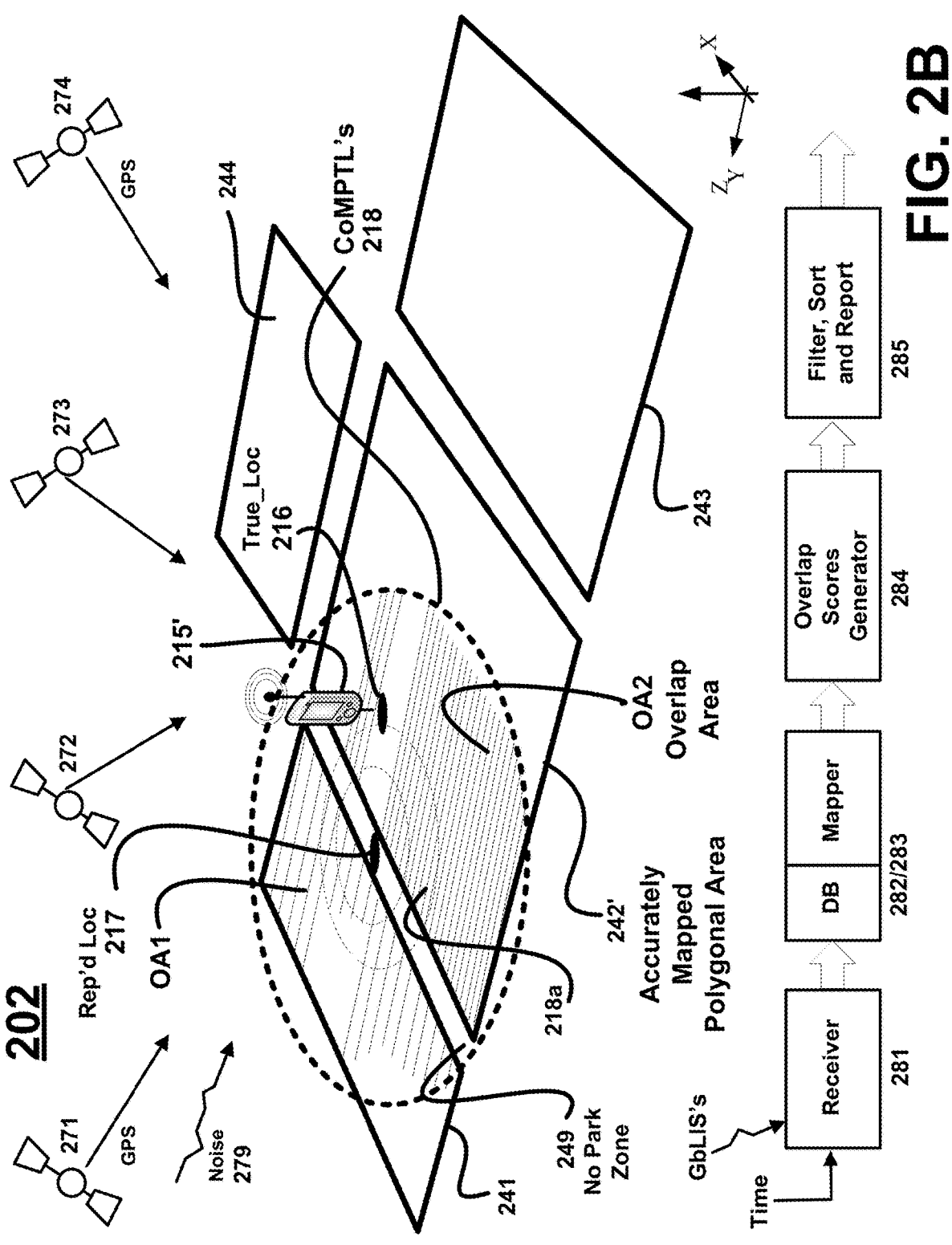
FIG. 2B is a schematic explaining how overlap of a predetermined range (e.g., circle) for more probable true locations (MPTL's, relative to a currently reported location) with sub-areas of accurately pre-mapped parking spots can be used for determining which accurately pre-mapped parking spot is the most likely one currently occupied by a vehicle having the GPS-based position reporting device.

It is to be understood that FIG. 2B assumes a circular region of same-weighted, more probable true locations (CoMPTL's 218) when explaining an example of the method. However, it is within the contemplation of the present disclosure to instead use non-circular closed-boundary geometric figures (e.g., ellipses, hexagons, octagons or other polygons) that are geographically oriented to account for predetermined contextual aspects of the associated parking lot, garage or other like structure; for example how the lot orients relative to trajectories of in the sky non-geostationary GPS satellites.

It is also within the contemplation of the present disclosure to not use same weights (meaning equal probability of occurring) for all the MPTL's within the circle (e.g., CoMPTL's 218) or within the alternatively-shaped bounding geometric figure for the correspondingly bounded MPTL's and to instead use a probability-of-MPTL distribution function other than a level one within the bounding geometric figure. For example, the circle (CoMPTL's 218) could be subdivided into annular sections (and a central smaller circle) each having a respective weight factor. The innermost part of the circle (next to its center) may have the greatest weight factor and then annular sections radially further out from the center may be assigned successively lower weight factors. The areas of overlap (described below) are then calculated using the weight factors to thus give the radially more inward of the logical MPTL's more weight than the radially outward MPTL's. In other words, respective overlap scores are assigned to respective ones of the polygonal areas (e.g., mapped parking spots) based on integrating the respective weighting factors with the respective overlaps of their respective annular sections. The probability distribution function for the MPTL's can be any kind other than the given example of annular sections. More specifically, the probability distribution function within the circle or other geometric shape bounding the MPTL's can account for orientation factors such as how the lot orients relative to current in the sky positions of non-geostationary GPS satellites, how GPS signals bounce off of adjacent structures and/or other such factors. More generally, the shape of the bounding geometric figure and/or the shape of the probability distribution function (weighting function) used within it can vary with extant context (e.g., the reported location, the current weather conditions, current level of measured ambient noise, presence of surrounding radio wave reflecting structures, time of day, day of year, and so on).

While one example given here relates to the fast food pre-ordering and curbside pick-up industry, the present teachings are not to be limited to just such an example. There are many aspects of day-to-day living where appointment-makers, order-placers and/or prospective recipients of goods/services expect to have their presence in a designated wait-at and pick-up location (or service delivery location, e.g., valet parking) properly noted and corresponding goods/services timely provided, for example at a scheduled time or in a scheduled or implied time span after arrival. The respective recipients/appointment-makers may experience dissatisfaction and disappointment if: (a) their expectations are not well managed, (b) if queues for different kinds of patrons (e.g., drive-through ones, pick-up-at spot ones) are not well managed and wait times are substantially longer than planned for, (c) if goods/services provisioning resources are not well managed to coincide with expectations and arrival times of recipients and (d) if the requested goods/services are not provided in timely, high quality manner or not at all. Further examples of where similar kinds of issues typically arise include slow-food restaurants that feature a to-go pick up service at curbside or in the parking lot, garage or other like structure. Yet other examples include medical or alike service providing venues where patients drive up to a parking area adjacent to an urgent care center with the expectation that an urgent care health provider will meet them there (e.g., with a wheel chair or gurney) to immediately attend to their needs. Entertainment providing venues may have similar problems where customers pre-order tickets online, show up at a valet-provisioning spot and find no valet parking attendant there to park their car. Yet further examples include item-pick up areas where patrons have made appointments to pick up online pre-ordered goods, timely show up at the agreed to pick up area and then have to wait for unreasonably long wait times because service personnel are unaware of their presence at a specific parking spot.

For sake of brevity, "goods/services" will be used herein to refer to the provisioning of any one or more of goods, services and service providers as appropriate for a given context.

In accordance with the present disclosure, a more reliable determination is arrived at with respect to which parking spot or other polygonal area a specific GPS position reporting device is located in by having a predetermined and relatively accurate mapping of the parking lot, garage or other like structure and mapping the GPS-based reported location onto the same map. Then a mapping of the CoMPTL's circle (or other appropriate geometric bounding figure representative of its bounded more probable true locations) is overlaid on the map and overlap areas or associated overlap scores are computed for where the polygonal areas overlap with the CoMPTL's circle (or other appropriate geometric bounding figure). The polygonal area that receives the highest (and preferably above-minimum threshold score) overlap score is deemed to be the most likely candidate for where the GPS position reporting device is likely to be situated. Further details are provided below.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the present teachings. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

More specifically, when the term "GbLIS" (GPS-based Location-reporting and ID-reporting radio Signal) or its equivalent "GbLI-signal" is used herein, it is to be construed broadly unless otherwise specified as encompassing any wirelessly transmitted signal (or set of signals) that can be detected as specifically indicating presence of its emitter in a relevant finite area and providing information about the GPS-based determination of location of that GbLIS-emitter as well as uniquely identifying the emitter and/or uniquely identifying the possessor of the emitter or a transaction associated with it. Optionally, as noted above the GbLIS-signal(s) may regularly or from time to time provide current velocity information. In the case of automatically pushed GbLIS's, a repeatedly broadcast Bluetooth beacon (modified to include the GPS information) can qualify as a GbLIS. Repeatedly broadcast beacons of other types of radio protocols including spectrum hopping ones can qualify as pushed GbLIS's. A repeatedly broadcast Wi-Fi signal or UWB signal can qualify as a GbLIS. The repeated broadcasting of the GbLIS can be due to built functions of the utilized operating system in the associated mobile device or due to specially installed programs, applications or services (including Background Peripheral Services, or BPS's). In one embodiment, a BPS is configured to respond to a pull signal wirelessly sent from a controlling system, to awaken in response to the pull signal, to then send out the GbLI-signal and afterwards go back to sleep, thus saving battery power. The GbLIS may contain an identification that uniquely identifies its mobile device and/or uniquely identifies its user and/or uniquely identifies a specific transaction involving corresponding goods and/or services as well as containing the GPS-based current location report and optional current velocity report.

FIG. 1 illustrates an environment (e.g., a fast food retail venue) 100 which can support a number of different online and in-person ordering schemes in accordance with the present disclosure including curbside and/or parking lot pickup. The schematic illustration depicts the venue 100 as having venue-controlled or venue-monitorable areas such as a vehicle drive-through interface area 110, a pedestrian interface area 120, a product processing and delivering area 130 (e.g., kitchen 131 and attendants' interface area 132), a vehicle parking area 140 and/or other vehicle accommodating areas (e.g., a storefront at curb parking area—not shown). For some of relatively small regions among these areas, it can be important and financially practical for business operations to detect with a high degree of resolution, isolation and confidence the presence of a single beacon transmitter in that relatively small region (narrow width region of interest). An example of such a fine resolution region of interest is that adjacent to the verbal order receiving microphone or speaker of a fast food drive through area. Another example of such a fine resolution region of interest is that adjacent to the order pickup window 112 of a fast food drive through area. Particularly when customers are tightly queued one immediately next to the other it is important that taking of orders and corresponding handing out of ordered goods should not be mixed up when using the beacon emitters of customers as a means for associating the orders with the respective customers.

However, when it comes to outdoor parking lots, large garage structures, long stretch curbside parking spots and the like (represented by item 140 in FIG. 1), it is often not financially practical for business operations to implement position detectors having fine resolution (e.g., determining location to within a meter or even less). Instead, it is preferable to rely on course position determining technologies such GPS-based position determination and/or triangulation between cellular base stations (e.g., cell towers, 5G stations). These courser position determining technologies can generally determine location as being somewhere in areas of a radius of many meters. More specifically, as noted, GPS-based position determination typically has a relatively large Circle of predetermined-as-More Probable True Locations (CoMPTL's) in the range of radii of 10 meters or more in length. That can be insufficient for pinpointing the parking location of a vehicle parked in an outdoor parking lot or the like 140. The present disclosure provides a method and mechanism for improving on that by using pre-mapped high accuracy locations of certain polygonal areas (e.g., staked out parking spots).

The above are examples of exterior goods/services providing spots that may be found in a patrons-servicing establishment. The illustrated example shows that an establishment 100 may include interior goods/services providing spots an interior sitting area (e.g., a waiting area with furniture such as metallic tables and/or metallic chairs) where patrons such as 123 who have pre-ordered online or at a verbal order taking station while using worn (or carried) location-revealing mobile devices 115' may wait for the requested items to be delivered to them (to their specific seat) by a service provider (e.g., waiter) or to be notified that the requested items are available at a pick-up window or counter. The establishment may include interior queue lines where other patrons who have pre-ordered online (and who optionally carry or wear location-revealing mobile devices or who plan to verbally order at the counter, can line up for more immediate service at a service counter where; when they reach the counter, they expect to immediately receive their preordered items (e.g., fresh hot food items, cold drinks) or have their verbal order immediately taken at that spot. The establishment may include one or more drive-through servicing stations and/or windows 112 (optionally of different kinds, including those with order receiving microphones or speakers) to which driving-through vehicles 114 approach in order to verbally place orders or immediately receive delivery of their online or otherwise pre-ordered (and optionally pre-paid for) items. The driving-through vehicles 114 and/or their drivers may possess location-revealing mobile devices such as smart phones 115, smart watches and so on used for associating the orders with unique identifications broadcast by their location-revealing mobile devices (beacon emitting devices) and for thus also associating the orders with the respective customers (and for optionally pre-paying for the goods/services) and for tracking fine resolution locations of the location-revealing mobile devices so that the ordered goods/services can be correctly provided to the associated customers as they approach the interior or exterior wall (e.g., 112) servicing stations.

In one embodiment, the establishment 100 includes or has access to medium and fine resolution location determining scanners (e.g., Bluetooth™ scanners, Fifth generation (5G) Wi-Fi scanners, etc.) 127 which cooperatively interact with software installed in the location-revealing mobile devices (e.g., 115, 115', 115", 115''') of the various patrons (e.g., seated patron 123, driver in vehicle 114) for determining to varying degrees of resolution, their respective locations in areas or sub-areas (e.g., 110, 120, 140, 160) for which the establishment has tracking rights or permissions where the tracking can be carried out to respective levels of course, medium and finer resolutions (e.g., the finer being to within about a meter or less and the course ones having resolutions of no better than 5 to 10 meter radii). Although not shown in FIG. 1, it is to be understood that the fine resolution location determining scanners 127 are operatively coupled (e.g., wirelessly or by way of cables or IR light beams) to a computer network for relaying location determinations made by them for processing by one or more data processors available on the network. The scanners 127 can keep track to appropriate levels of resolution (e.g., to within 6 feet, 3 feet or less, etc.) of where pedestrians are in the pedestrian interface area 120 and where vehicles are in vehicle accommodating areas such as drive-through lane 110. For the case of larger scale areas such as parking area 140, coarser location determinations technologies are preferably used as shall be detailed herein. Although shown in FIG. 1 only by means of schematic dots, it is also to be understood that marked off parking spots 141a-141n (n representing a relatively large number; e.g., 10, 20 etc.), respective GPS position reporting devices 115''' may be transmitting GbLI-signals from within those parking spots 141a-141n after the respective vehicles have parked there. Some parking spots may be empty. It is to be understood that although Bluetooth™ and 5G directed beam Wi-Fi transceivers are mentioned as examples of medium and fine resolution location determining scanners (e.g., ones that can also receive corresponding GbLI-signals), the present disclosure is not limited to just these examples. Rather, numerous alternative wireless devices can be used for locating patrons to different levels of resolution (e.g., from coarse ones having 20 meter or greater radii CoMPTL's to finer resolution ones of one meter or less, preferably 2 feet or less), these including optical (e.g., IR) receivers of reporting signals, radio receivers and/or acoustic signal receivers. In particular, in this disclosure, the use of the coarser position reporting devices such as those based on GPS position determinations will be discussed.

In one embodiment, it is desirable to have a GPS-based position reporting feature of each patron's respective mobile device (e.g., 115") active and reporting the location of the patron's vehicle (e.g., 114") even before the vehicle enters (e.g., via entrance way 161 from approach street 160) the associated parking lot, garage or other like structure 140 having marked off parking spots (e.g., 141a-141n). The GPS-based position reporting feature outputs GbLI-signals to corresponding report receiving detectors of the establishment 100. A mapping of the marked off parking spots (e.g., 141a-141n) and optionally of other marked off polygonal areas in the parking lot, garage or other like structure 140 (e.g., no-parking areas, crosswalks) is used in conjunction with the received GbLI-signals to improve resolution in the determinations of which polygonal area (e.g., parking spot) the vehicle 114" is most likely to be located.

Referring to FIG. 2A for purpose of an introductory context 201, in some instances a patron is instructed to park his/her vehicle 214 in an exterior parking spot 242 (exterior of the main interior portions of the establishment (e.g., 120, 130)) and informed that the ordered or requested (and optionally pre-paid for) items will be immediately or shortly thereafter (e.g., within 5 minutes) be delivered to him/her at that pickup spot. In accordance with the present disclosure the pickup spot 242 is a polygonal area, for example a rectangular area having an accurately pre-mapped width boundary 242w and length boundary 242L. The polygonal area does not have to be rectangular. It can have any of many other closed boundary shapes such as trapezoidal, triangular and so on and the sizes of the polygonal areas can vary across the parking lot, garage or other like structure. This offered service feature of delivering to the parked location creates several problems for the goods/services provider. For example, the provider has to figure out how to make sure the delivered goods (e.g., food) are in ripe condition for delivery at the appointed pickup spot 242 (e.g., fresh and hot), how to make sure a parking lot attendant (e.g., from interface are 132 of FIG. 1) is ready to get the ordered or requested items and deliver them on time to the appointed pickup spot 242 and how to inform the parking lot attendant as to which of the many spots (e.g., 141a-141n) in the parking lot, garage or other like structure 140 is the one that this patron is parked in. An additional problem is how to allow the waiting recipient to use his mobile device while waiting. Yet another additional problem is how to do all this while keeping costs low.

The illustrated introductory context 201 of FIG. 2A is somewhat simplistic because no vehicle (e.g., motorcycle, car, bus, truck) should reasonably park to the right of parking spot 242, say over the raised curb 248. Moreover, in the illustrated context 201, no additional vehicle can park in an area immediately in front of vehicle 214. The parking angle is at 90° to the direction of the parking row. However, it is to be understood that in other contexts, the parking lot, garage or other like structure 140 may be crowded and have areas that allow for angled parking with vehicles facing head on to each other as well as being side-to-side with one another. Parking spots may come in varied sizes (e.g., compact, full size, extra large) and different shapes. The lots may have parking spots with different parking permission rules (e.g., disabled, reserved, electric only, motorcycles only, 5 minute pickup only, and so on). Additionally, FIG. 2A shows a bullseye target marking 246 painted on the floor. Possible uses for this marking 246 will be described later.

Referring to FIG. 2B, shown is a second context 202 which represents a real world situation that includes the illustrated GPS satellites 271-274, parking spots 241-244 and the illustrated data processing circuits 281-285 and simultaneously represents a mapping of the parking spots 241-244 that has overlaid on it a corresponding mapping of a geometric figure (e.g., circle 218) which bounds on-map areas that can contain those of possible true locations of a GPS position reporting device 215' the locations that had been predetermined as being the more probable true locations (MPTL's) for that device relative to a location 217 reported by that device. More specifically, in FIG. 2B, first through fourth substantially adjacent rectangles 241, 242', 243 and 244 represent respective allowed parking spots of different sizes and orientations. The boundaries of the parking spots (241-244) have been pre-established for example through surveying with appropriate means (e.g., laser measurements taken relative to a surveyor's medallion which could be a function of marking 246 of FIG. 2A) such that the locations of these boundaries are accurately known to a spatial resolution much finer than possible with a single GPS reading (the latter being prone to the above-described probability of error (PErr) issues). The represented mapping of the situation need not extend much beyond the size of largest CoMPTL's (Circle of predetermined as More Probable True Locations) possible for the given situation. The meaning of parking spots (or other such polygonal areas) being substantially adjacent to one another can vary based on context but generally means that the parking spots/polygonal areas are spatially packed next to one another such that the largest CoMPTL's will encompass two or more of those parking spots/polygonal areas.

In the illustrated example 202, the reported location 217 that is determined by device 215' based on the current in-view GPS satellites 271-274 (and in presence of ambient noise 279 and/or other error creating factors) ends up being located somewhere in a no-parking inter-space 249 between substantially adjacent first and second parking spots 241 and 242'. Polygonal areas 243 and 244 are further parking spots disposed within the vicinity. It is to be understood that FIG. 2B is not necessarily to scale. As mentioned earlier, a typical CoMPTL's (Circle of predetermined as More Probable True Locations) may have a radius that covers many more parking spots but it doesn't have to be that large. Its size can vary based on extant conditions. For sake of simplicity, the illustrated CoMPTL's circle 218 is shown only partially covering first and second polygonal areas 241 and 242' as well as the interposed no-park zone 249 (e.g., driver walkout path). The problem here is to decide while not being able to see GPS position reporting device 215' whether its true location (TL) 216 is inside the first polygonal area 241 or inside the second polygonal area 242'.

In accordance with the present disclosure, overlap areas (e.g., OA1 and OA2) are automatically determined for the CoMPTL's 218 as overlaid on a same scaled mapping of the polygonal areas 241-244. If OA2 is determined to be sufficiently greater than OA1 (e.g., at least 10% greater) then an automated decision is made that the position reporting device 215' is more likely inside polygonal area 242'. Alternatively, if OA1 is determined to be sufficiently greater than OA2 then an automated decision is made that the position reporting device 215' is more likely inside polygonal area 241. In one variation the CoMPTL's 218 is subdivided into an inner smaller circle and surrounding annular rings like 218a. Other forms of subdivision are possible. Each subdivision is given a weight, say W1 for the inner small circle, W2 for annular ring 218a, W3 for the next radially outward ring and so on, where in one example, $W1>W2>W3> \ldots \geq 1$. (In an alternate embodiment, $W1<W2>W3> \ldots \geq 1$. In yet another alternate embodiment, one or more of the weights are equal to one or less than one.) An effective overlap score for second polygonal area 242' is then computed as W1 times that portion of the inner small circle overlapping polygon 242' plus W2 times that portion of annular ring 218a overlapping plus W3 times the overlap by the next radially outward ring (not shown) and so on. A same similar calculation will be performed for the respective effective overlap score for first polygonal area 241. As will be appreciated, shifting the reported location 217 slightly to the right along the Y direction may favor polygon 242' as having the greater overlap area OA2 (or alternatively the greater effective overlap score) while shifting the reported location 217 slightly to the left along the Y direction may favor polygon 241 as having the greater overlap area OA1 (or alternatively the greater effective overlap score). Moreover, shifting the reported location 217 significantly to the back along the X direction may bring fourth polygon 244 into play as a candidate parking spot inside of which the position reporting device 215' is likely to be located. It is to be understood that calculation of unweighted overlaps or overlap scores does not have to be to extreme precision. Approximating trapezoids and/or triangles can be used to approximate the shape of the circle (or other such bounding geometric figure) and its subdivisions. This allows for reduction of computational workload. The term "overlap score" can be deemed synonymous with unweighted overlap area or its relative equivalent when the weights (e.g., W1, W2, W3, etc.) all equal one or another constant.

In one embodiment, after the vehicle is determined to be parked because its speed is zero for a predetermined duration (based on accelerometer readings and or lack of change over time in the reported location); the size (e.g., radius) of the CoMPTL's 218 is determined based on currently present or normally present ambient noise 279 and/or based on other factors (e.g., time of day, day of year) that can affect probable size and/or probable direction of error as between true location (216) and reported locations. Optionally the CoMPTL's 218 is subdivided and respective weights (e.g., W2) are assigned to the subdivisions (e.g., 218a). The corresponding overlap area (e.g., OA1, OA2) or effective overlap score is computed (e.g., approximated) for each of the respective polygonal areas (e.g., 241-244) in the broader area. Then the results are sorted with the greatest calculated overlap area (e.g., OA2) or the greatest calculated overlap score being at the top of the list. In one embodiment, a filtering step is applied to the sorted list. Computed overlaps or overlap scores that are less than a predetermined fraction of the maximum overlap computation possible for each respective polygonal area (say less than at least 10% to 30% of the possible maximum) are automatically deleted from the list. If none of the computations remain on the list after this filtering step then the parking attendant (from area 132 of FIG. 1) is automatically informed that a different method of locating the customer needs to be used (e.g., trying to call the customer). If only one computation remains on the list after this filtering step then that customer location is automatically reported to the attendant as the location to be served. If two or more computations remain on the sorted list after this filtering step then the top N computations (e.g., the top 3) are automatically reported to the attendant as parking spots to try in that order.

In FIG. 2B, item 281 represents a wireless receiver that receives the GbLI-signals that are automatically repeatedly transmitted from the position reporting device 215'. The receiver 281 extracts the reported location information (217), the unique identification of the transmitter (and/or of the user or transaction) and optionally, velocity information that may be present in the received GbLI-signals. It adds a time stamp (time of receipt) to the extracted information and then forwards a digitized version of the same to a database (DB) 282 for storage and further processing.

Item 283 represents a data processing circuit (mapper) that has stored in it a relatively accurate map of the polygonal areas in the vicinity (e.g., that which includes the reported location and area around it at least to spatial size of a maximum possible CoMPTL's). As processing bandwidth allows, the mapper scans the DB 282, pulls out the latest reported location information (217) and optionally any prior trajectory information associated with the latest reported location information. The latest reported location is mapped onto the pre-stored map of the vicinity and then the mapper 283 generates from the on-map positioning of the reported location, an on-map bounded geometric figure (e.g., CoMPTL's 218) that encompasses the mapped reported location and bounds on the mapping, corresponding predetermined as more probable true locations (MPTL's; e.g., the more probable 95%) among possible locations for the position reporting device while excluding the less probable true locations (e.g., the less probable remaining 5%). The mapper then identifies the on-map overlapped areas (e.g., OA1 and OA2) for the generated on-map bounded geometric figure (e.g., CoMPTL's 218) and the on-map representations of the local polygonal areas (e.g., 241-244). It is to be understood that the division between the DB 282 and the mapper 283 is a variable one since the mapping of the local vicinity can be partly or fully contained in the DB 282 rather than in the mapper. Therefore when the above mentions the mapper 283 as having a mapping of the local vicinity, the latter could have been obtained from the DB rather than being always stored in the mapper 283.

Item 284 represents a data processing circuit that receives digital representations of the mapped polygonal areas (e.g., 241-244) and of the mapped geometric figure (e.g., CoMPTL's 218), automatically determines the relative amounts of overlap for the identified overlaps and generates corresponding overlap scores. Item 285 represents a data processing circuit that receives the overlap scores generated by circuit 284 and the associated identifications of the overlapped polygonal areas. Circuit 285 then optionally filters the received overlap scores (e.g., to enforce a minimum overlap sufficiency requirement if applicable), sorts them and then outputs a report as to which polygonal area or areas are the best candidates; or if none, it reports that no area could be reliably picked by this method. The user can then choose alternate methods for determining the location of the GPS position reporting device (e.g., 215').

Additional factors may be used to improve the chance that the parking delivery attendant (e.g., from area 132) will pick the right parking spot and right vehicle. For example, based on the unique identification in the GbLI-signal, a customer profile may exist that includes information about the customer's normally used vehicle such as type, make, model, license number, color and so on. That additional information is pulled and forwarded (e.g., wirelessly) to the attendant who is servicing the curbside or like delivery spot and the attendant uses the information in combination with the listing of most likely candidate spots to pick the most likely vehicles in order of their listed likelihood.

Alternatively or additionally, in one embodiment, the trajectory of the vehicle (e.g., 114" of FIG. 1) is automatically monitored after its speed falls below a predetermined first value (e.g., below 35 Miles Per Hour) and remains above a predetermined second value (e.g., above 5 MPH) under the assumption that the driver is looking for a parking spot to pull into. During this time, rather than trying to determine which parking spot the vehicle is stopped in, the GPS-based reported locations extracted form the received GbLI-signals are used to approximate which approach lane in the parking lot, garage or other like structure 140 the vehicle is likely to be moving along. Short pauses (e.g., 15 seconds or less) for stop signs and the like are ignored. In one embodiment, the pre-parking trajectory information is relayed to the assigned delivery attendant (of area 132, and optionally to the kitchen 131) to inform him/her (and/or the kitchen) that the customer is in the process of trying to find a spot to park the vehicle in. After the vehicle stops for more than a short pause (e.g., stops for 30 seconds or more), it is determined that the vehicle has likely parked. Then the above, zero speed process is used to determine which parking spot is the most likely one. However, because the trajectory of the vehicle just prior to parking is known, that information can be used in combination with the sorted list of likely parking spots (or other such polygonal areas) to improve the chance of picking the right parking spot. For example, based on the approach trajectory prior to full stoppage, some candidate parking spots (or alike polygonal areas) can be excluded from the candidates list (the sorted list of overlaps). It is to be understood that the area overlap method by itself is usable irrespective of what the different shapes and sizes of the polygonal areas are. However, size and shape of parking spot may be taken into consideration when make, model and other profile extracted details about the vehicle and its owner are obtained. For example, larger sized vehicles may not reasonably fit into smaller parking spots and thus the latter may be filtered out from consideration. Owners who are not entitled to park in special privilege parking spots should not be doing so and thus the latter may be filtered out from consideration as reasonable candidates.

Referring back to FIG. 2A, in one embodiment, pre-marked target areas like 246 are distributed about the lot and used for taking samplings of current GPS-based reported locations while the position reporting device is located directly above the center of the target 246. Statistical profiles are produced over appropriate time durations (e.g., a 24 hour day, a 72 hour sampling window, week, month, etc.) for determining examples of more probable and less probable reported locations at each target position 246 in the parking lot, garage or other like structure 140. (Only one target is shown in FIG. 2A but there can be more distributed about the lot.) If later, a reported location (e.g., 217) is disposed much further away from any pre-marked target area (e.g., 246) extrapolation between the CoMPTL's circles or alike MPTL's-bounding geometric figure may be used to derive the appropriate MPTL's-bounding geometric figure for that particular reported location (e.g., 217).

In one embodiment, the samplings for deriving appropriate MPTL's-bounding geometric figures are taken using a remotely controlled flying drone (not shown) having a GPS receiver at its top side, a camera disposed underneath for spotting the center of the target 246 from its under carriage and a wireless transceiver operatively coupled to the GPS receiver and configured to automatically repeatedly output test GbLI-signals for verifying operability of the system and developing the statistical models for the more probable true locations when given the extant conditions (e.g., time of day, weather conditions, reflective surrounds, etc.) at the respective reported locations. Alternatively or additionally, a parking lot attendant can periodically walk about the lot with a pole having the GPS receiver at its top (at a predetermined height). The attendant can spot the bottom of the pole at the center of the known targets 246 (only one shown) for taking the statistical samplings. The attendant may carry the wireless transceiver that automatically repeatedly outputs the test GbLI-signals or it may be mounted on the pole and operatively coupled to the GPS receiver. Thus context appropriate CoMPTL's (or other appropriate MPTL's-bounding geometric figures) may be developed for each unique parking lot, garage or other like structure 140. Alternatively, the CoMPTL's may be selectively picked from sets developed at substantially similar standardized lots.

Figure 3:
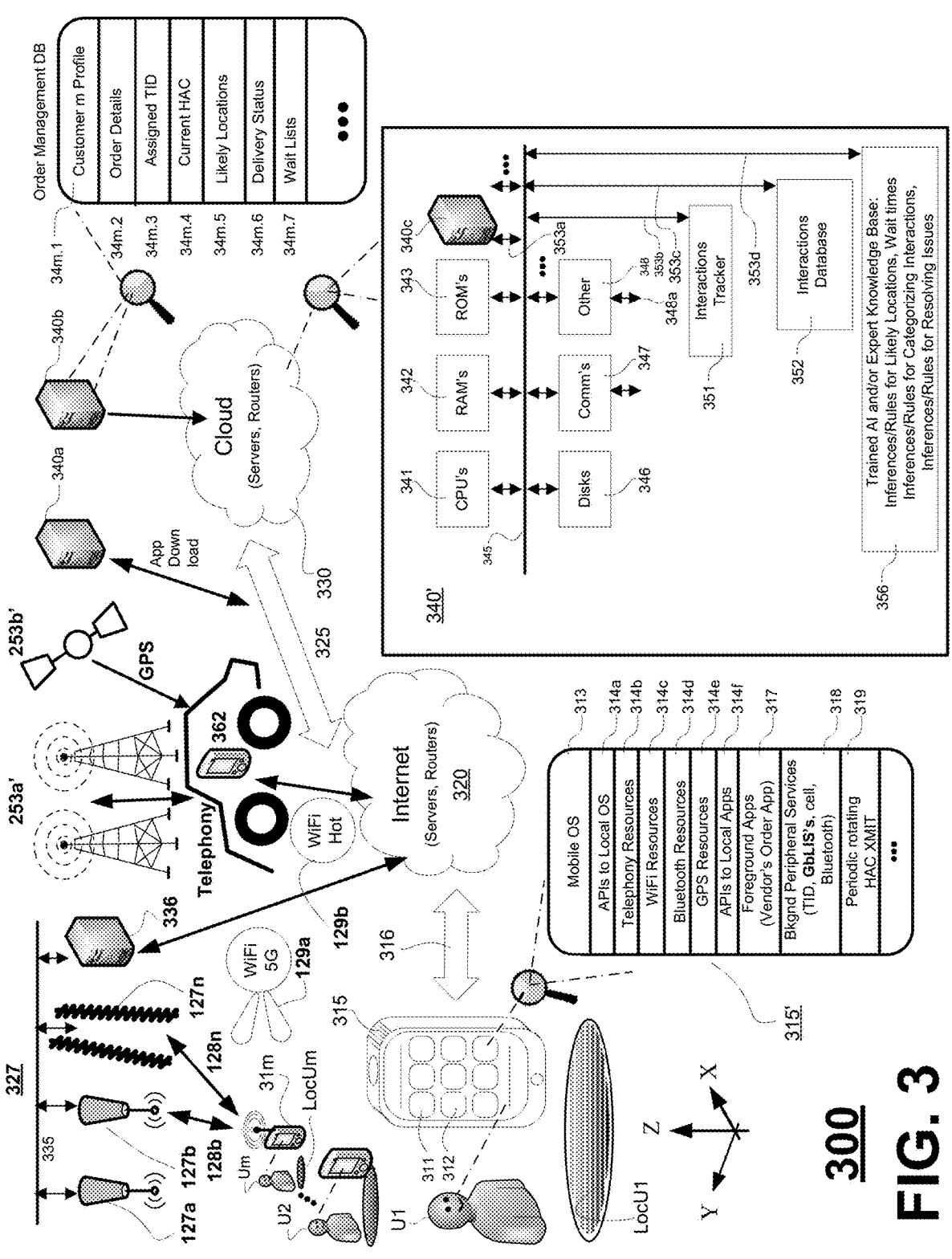
FIG. 3 illustrates a system for determining a location of a mobile user using a personal mobile device as a GPS position reporting device.

Referring to FIG. 3, illustrated is a system 300 configured for managing location sensitive queues and wait-lists, including managing delivery of goods/services to vehicles (e.g., 362) approaching and parking into curbside or alike pickup spots. The system 300 includes portions for automatically determining both coarser and pinpointed respective locations (e.g., LocU1, . . . , LocUm) of respective mobile users (e.g., U1, U2, . . . , Um) using their respective personal mobile devices (e.g., 315, . . . , 31m) carried and/or worn by the users as the users traverse various areas including those serviced by cellular telephony base stations (e.g., cell towers 253a'), serviced by GPS satellite constellations 253b' (see also 271-274 of FIG. 2B) and serviced by finer resolution, location determining means (e.g., scanners 327—see also 127 of FIG. 1). When a user enters a coarsely monitored parking approach area (e.g., 160, 161 of FIG. 1) or finally stops in a curbside or alike pickup spot (e.g., 141a-141n of FIG. 1 and 241-244 of FIG. 2B), the automatically and repeatedly output pushed GbLI-signals and/or the request-driven pulled GbLI-signals are wirelessly received by an appropriate receiver and processed to determine, despite presence of error in the GPS-based location report, the more likely locations of the vehicle (e.g., parking spot 242'). An attendant servicing the parking areas is assigned to the corresponding transaction (e.g., delivering that recipient's food order) and is automatically informed of the system's best guess or guesses as to where the vehicle (e.g., 362) is parked based on the repeatedly output GbLI-signals.

As indicated in magnified details area 315', the exemplary respective mobile device 315 of exemplary user U1 typically has a predetermined operating system (OS) 313 currently executing within it. Device 315 may have a set of application program-to-OS interfaces (APIs) 314a for allowing various further programs 317 within the device 315 to access resources of the OS 313. In one embodiment, the OS allows for OS mediated control over local telephony resources 314b, Wi-Fi interface resources 314c (e.g., including generation G4 resources), Bluetooth™ resources 314d, and GPS resources 314e. One of the API accessible resources of the OS is that for establishing one or more background peripheral services (BPS's) 318 that may be dynamically and wirelessly connected to from external devices (e.g., scanners 127a-127n). The executing OS 313 may on its own periodically test for presence of nearby Bluetooth™ and/or Wi-Fi devices (e.g., scanners 127a-127n, 5G Wi-Fi routers 129a, 129b and alike other such short range transceivers, e.g., UWB ones) and in response to detected presence, occasionally wirelessly broadcast its own Bluetooth™ beacon and/or repeated Wi-Fi signal or other presence-reporting signal which includes a current hardware accessing code (HAC) of the mobile device 315. In one embodiment, the Bluetooth™ reporting signal has a unique and consistent signature portion that can be used for locating the HAC code as being positioned at a predetermined bit position of fixed bit distance away from a unique signature portion of the PA-signal. The HAC code may extracted based on its predetermined bit position relative to the signature even though the HAC code itself changes on a pseudorandom basis. The schematic of FIG. 3 illustrates the code for occasionally transmitting a rotating HAC as being disposed at section 319 of the personal mobile device. The schematic of FIG. 3 also depicts one or more of established BPS's at area 318. One of the BPSs is one which transmits automatically repeated GbLI-signals that include respective GPS-based reported location information and unique identification information that uniquely identifies at least one of the GPS position reporting device, the owner of the device and/or a transaction currently associated with the device or its owner. In one embodiment, the identification information includes an associated TID (a system-assigned temporary transaction ID sequence). The received GbLI-signals can be routed out via the internet to a server (e.g., 340b) controlled by the establishment. Another of the BPSs is one which transmits a Wi-Fi signal revealing the current cellular telephony coordinates of the mobile device 315 as well as identifying the mobile device (e.g., by its currently assigned TID). This Wi-Fi signal can be routed out via the internet to a server (e.g., 340b) controlled by the establishment. The establishment controlled server (e.g., 340b) may then determine current coarse locations of the mobile device based on the received GPS and/or telephony information and store the results in corresponding database entries (e.g., 34m.5). The coarse position determinations may be refined, for example using the polygonal areas overlap methods disclosed herein in cases where it is reasonable to assume that the vehicle has parked or otherwise stopped in a pre-mapped polygonal area.

Various foreground programs that may be used by the user while waiting for provisioning of the requested goods and/or services are depicted as being present in area 317. API's to the local apps in the mobile device are depicted as being present in area 314*f*. One of the foreground programs that will be running in region 317 in accordance with one embodiment is a vendor's ordering and order progress advisement program. An example of an initial, program launching GUI for the mobile device is depicted at 315 with application invoking icons such as 311 and 312 being present on the displayed graphical user interface. One of the application invoking icons (e.g., 311 or 312) may cause a launching of a vendor's ordering and order progress advisement application. This application is stored in area 317 after being downloaded for example from a vendor controlled server 340*a* located in cloud 330 or elsewhere on the Internet 320. The ordering and order progress advisement application may advise the waiting user that an attendant is on his/her way to the parking spot with the requested goods/services and should arrive in X minutes. The application may give the user a general description of the attendant (e.g., what kind of uniform is being worn) for purpose of improved security.

FIG. 3 more broadly depicts an integrated client-server/internet/cloud system 300 (or more generically, an integrated multi-device system 300) within which the here disclosed technology may be implemented. System 300 may be understood as being an automated machine system having distributed intelligent resources including a variety of differently-located data processing and data communication mechanisms including for example, user-carried/worn mobile wireless units (e.g., wireless smartphones 315, . . . , 31*m*) configured to allow end-users thereof (e.g., U1, U2 . . . Um) to request from respective end-user occupied locations (e.g., LocU1) services from differently located enterprise hosts (e.g., on-internet 320 and/or in-cloud servers 340*a*, 340*b*, etc.). In one embodiment, server 340*a* handles the downloading of vendor ordering and order progress advisement apps into mobile devices that request them. The downloading process may include generating unique customer profiles (e.g., including billing information) and customer identifications that are to be used when the respective customers place orders at a later time. In one embodiment server 340*b* handles the managing of placed orders. Server 340*b* may include or connect to an order management database which keeps track for each order-placing user (e.g., user Um, where m is an integer) of: (a) the user's customer profile 34*m*.1, (b) the details of the placed order 34*m*.2; (c) a system-assigned temporary and unique transaction identification sequence (TID) 34*m*.3 assigned to the corresponding transaction; (d) a current hardware address (e.g., HAC) being currently used by the customer's personal mobile device (e.g., 31*m*.4); (e) a current one or more coarse and comparatively more pinpointed locations 34*m*.5 of where the recipient is determined to most likely be present at (e.g., in or near the establishment or further away and including those determined to high level of confidence using directional antennas); (f) information about the delivery status 34*m*.6 of the requested goods and/or services that the present transaction is directed to; and optionally additional information as may be appropriate for the vendor's business model.

It is to be understood that the illustrated configuration of system 300 is merely exemplary. As indicated, it comprises at least a few, but more typically a very large number (e.g., thousands) of end-user devices 315 (only a few shown in the form of wireless smartphones but understood to represent many similarly situated mobile and/or stationary client machines—including the smartphone wireless client kinds, smart watches, and cable-connected desktop kinds). These end-user devices 315 are capable of originating service requests which are ultimately forwarded to service-providing host machines (e.g., in-cloud servers like 340*b*) within a cloud environment 330 or otherwise on-internet or linked-to internet machines (e.g., 340*b*). Results from the service-providing host machines are thereafter typically returned to the end-user devices (315, . . . 31*m*) and displayed or otherwise communicated to the end-users (e.g., U1, U2, . . . , Um, m being an integer). For example, if the business of the vendor is an online, food pre-ordering one, the end-user (U1) may have installed on his/her smartphone (315) a software application ("app" 317) that automatically requests from the order managing server 340*b*, a list of nearest vendor venue locations, the menu of the items that may be ordered online and estimates for when the items will be ready for pick up at a selected one of the venues. In response to the request, enterprise software and hardware modules automatically identify the user, pull up a user profile (e.g., 34*m*.1), store the order details (34*m*.2), assign a temporary and unique transaction identification sequence (TID) 34*m*.3 to the corresponding transaction (install it into a corresponding one or more BPSs) and inform the customer of a time range when he or she might arrive at the venue to pick up the order as well a specific location for the pickup (e.g., a drive-through window with directional antenna detection of the user being directly in front of the window). The assigned TID may be downloaded into the BPS's of the ordering app at that time order placement or at a later time before it is needed.

When the customer (e.g., Um) arrives at the designated venue and enters an area covered by the receivers (not specifically shown, but coupled to signal detectors like antennas 127*n* for example) that are configured to detect the GbLI-signals associated with the venue (e.g., 100), at least one of the local (e.g., 336) or backend (e.g., 340*b*) servers starts following the trajectory of the customer's vehicle (e.g., 362) as it moves down the lanes of the lot looking for a usable parking spot or other pickup spot. Then when the vehicle's velocity is at or below a predetermined minimum that indicates it is parking (or finishing its parking maneuvers), the above described GPS-based position reporting and position determination refinement steps are undertaken. In one embodiment and briefly, the presence of a HAC-advertising mobile device is detected; an attempt is made to dynamically connect wirelessly to the TID-returning and GPS-reported location returning BPS of that mobile device. The collected information is used for deciding which specific parking spot the mobile device is located inside of. In one embodiment, the local server 336 then consults with a database or expert rules knowledge base or an artificial intelligence (AI) system that had been appropriately pre-trained to collect rules and/or supplemental information for more accurately determining the most likely one or more locations for the targeted customer in view of other factors (e.g., background noise, radio reflections, etc.) that may be currently present at the venue. The determined one or more locations are then relayed to the tracking database, for example into entries region 34*m*.5. The entries region 34*m*.5 may store a history of recent locations and prediction of where the tracked user is most likely to be next located. A human or robotic server for assisting in quick delivery of the requested goods and/or services may then be dispatched to the predicted location of the customer.

In one embodiment, signal coupling from each of finer resolution scanners (127a-127n) to the local server 336 is a wireless one such as conducted over a Wi-Fi network. Alternatively, Bluetooth™ signals or UWB signals may be used where one scanner (e.g., 127a) relays its detections and measurements to the next adjacent scanner (e.g., 127b) and so on until the collected detection and measurement reports are relayed to the local server 336. Signals coupling link 335 represents the various ways in which the respective detections and measurements of the scanners (127a-127n) and or GPS position reporting devices are relayed to the local server 336. The signals coupling link 335 may be a wired one and/or may include wired and wireless subportions as opposed to being an all wireless signals coupling link.

In one embodiment, after receiving the respective detections and conducting the locations determinations as well as associating them with the detected TID sequence, the local server 336 connects via the Internet 320 to the order management server 340b. The order management server 340b uses the relayed TID sequence to reference the corresponding customer order details 34m.1-34m.7 of user Um and his/her corresponding order. The order management server 340b may additionally consult with an expert knowledge base and/or installed AI 356 (example shown in server 340') to determine, based on the relayed signal measurements and location determinations, what the one or more most likely current locations of the customer are at the respective venue and for the extant conditions there. When the ordered goods and/or services are ready for delivery to or pickup by the customer, the order management server 340b reports the latest one or more most likely locations of the establishment. For example the report may be in the form of a sorted list of most to least likely locations. In one embodiment, after pickup or delivery is reported as complete, the corresponding TID is erased from the user's mobile device and also from the database storage locations (e.g., 34m.3) so as to preserve privacy.

Aside from the end-user devices (e.g., 315, . . . , 31m) and the cloud servers (e.g., 340b) the system 300 comprises: one or more wired and/or wireless communication fabrics 316, 325, 335 (shown in the form of bidirectional interconnects) intercoupling the end-user client devices (e.g., 315, . . . , 31m) with the various networked servers (e.g., 336, 340a, 340b, 340').

Still referring to FIG. 3, a further walk through is provided here with respect to detailed components that may be found in one or more of the mobile devices and/or respective servers. Item 311 represents a first user-activateable software application (first mobile app) that may be launched from within the exemplary mobile client 315 (e.g., a smartphone, but could instead be a tablet, a laptop, a wearable computing device; i.e. smartwatch or other). Item 312 represents a second such user-activateable software application (second mobile app) and generally there are many more. Each end-user installed application (e.g., 311, 312) can come in the form of nontransiently recorded digital code (i.e. object code or source code) that is defined and stored in a memory for instructing a target class of data processing units to perform in accordance with end-user-side defined application programs ('mobile apps' for short) as well as to cooperate with server side applications implemented on the other side of communications links 316, 325, etc. In one embodiment and the case where an order is placed for respective goods and/or services by way of a non-mobile or not normally used client machine (e.g., a desktop computer), the order management server 340b automatically recognizes this condition and uses data available in the customer's profile 34m.1 to access the user's normally carried, personal mobile device and to transfer the assigned TID to that normally carried personal mobile device. In this instance, it is understood that appropriate, vendor provided software has been preloaded into the normally carried personal mobile device for securely enabling such transfer of the TID to the targeted mobile device. In this way, even if the customer places the order by way of a home desktop computer and then arrives at the venue with his/her normally-used mobile device, the customer tracking subsystem will still work.

More generally, each app (e.g., 311, 312, 317) may come from a different business or other enterprise and may require the assistance of various and different online resources (e.g., Internet, Intranet and/or cloud computing resources). Each enterprise may be responsible for maintaining in good operating order its portions of the system (e.g., local scanners, local servers, Internet, Intranet and/or cloud computing resources). Accordingly, the system 300 is shown as including in at least one server 340', an expert knowledge base 356 which contains various kinds of different expert rules for handling different conditions. One set of expert rules may provide for optimized customer location determinations at a given venue or venue observable area 327. Another set of expert rules may provide for less than optimum but acceptable customer location pinpointing when background noise is high. Yet another set of expert rules may provide for variable location determination based on different sets of layouts of furniture or other structural barriers at each respective venue and/or based on expected radio interferences and/or reflections at the given venue. Yet other of the expert rules may relate to categorizing different types of transactions and details about how to handle them, including how to resolve various problematic issues.

In addition to the AI system and/or expert knowledge base 356, one or more other portions of the system 300 may contain interaction tracking resources 351 configured for tracking interactions between customers and respective vendors and an interactions storing database 352 configured for storing and recalling the tracked interactions. Links 353a (to a further server 340c), 353b, 353c and 353d represent various ways in which the system resources may communicate one with the other.

As mentioned, block 340' is representative of various resources that may be found in client computers and/or the various servers. These resources may include one or more local data processing units (e.g., CPU's 341), one or more local data storage units (e.g., RAM's 342, ROM's 343, Disks 346), one or more local data communication units (e.g., COMM units 347), and a local backbone (e.g., local bus 345) that operatively couples them together as well as optionally coupling them to yet further ones of local resources 348. The other local resources 348 may include, but are not limited to, specialized high speed graphics processing units (GPU's, not shown), specialized high speed digital signal processing units (DSPU's, not shown), custom programmable logic units (e.g., FPGA's, not shown), analog-to-digital interface units (A/D/A units, not shown), parallel data processing units (e.g., SIMD's, MIMD's, not shown), local user interface terminals and so on.

It is to be understood that various ones of the merely exemplary and illustrated, "local" resource units (e.g., 341-348) may include or may be differentiated into more refined kinds. For example, the local CPU's (only one shown as 341) may include single core, multicore and integrated-with-GPU kinds. The local storage units (e.g., 342, 343, 346) may include high speed SRAM, DRAM kinds as well as configured for reprogrammable, nonvolatile solid state data storage (SSD) and/or magnetic and/or other phase change kinds. The local communication-implementing units (only one shown as 347) may operatively couple to various external data communicating links such as wired, wireless, long range, short range, serial, parallel, optical kinds typically operating in accordance with various ones of predetermined communication protocols (e.g., internet transfer protocols, TCP/IP, Wi-Fi, Bluetooth™, UWB and so on). Similarly, the other local resources (only one shown as 348) may operatively couple to various external electromagnetic or other linkages 348a and typically operate in accordance with various ones of predetermined operating protocols. Additionally, various kinds of local software and/or firmware may be operatively installed in one or more of the local storage units (e.g., 342, 343, 346) for execution by the local data processing units (e.g., 341) and for operative interaction with one another. The various kinds of local software and/or firmware may include different operating systems (OS's), various security features (e.g., firewalls), different networking programs (e.g., web browsers), different application programs (e.g., product ordering, game playing, social media use, etc.) and so on.

The advantages of the present teachings over the art are numerous. It is to be understood that the present teachings are not to be limited to specific disclosed embodiments. In the above description and for sake of simplicity, a fast food restaurant venue is described. However, this disclosure may be applied, but not limited to, valet parking or other services and/or curbside food/souvenir purchases made at stadiums, arenas, train stations, airports, big box store pickup areas and many other venues where it is desirable to track and pinpoint (as best as can practically be done) the location of a user of a normally carried and/or worn personal mobile device without encumbering the user to carry other devices not belonging to the user and/or not normally carried by the user.

FIG. 4 illustrates a method 400 for determining location of a GbLIS emitter in one of substantially adjacent polygonal areas (e.g., pre-mapped parking spots). The method includes receiving respective requests (e.g., orders) for corresponding goods and/or services from respective patrons before they arrive at the venue (e.g., from home online) and/or when they are at a kiosk or ordering window location (e.g., 112 of FIG. 1) and associating the received orders with a unique identification of a specific GbLIS emitter (e.g., 215') possessed by the patron. GbLI-signals output by the emitter are received and the GPS-based reported location information (e.g., 217) and unique identification are extracted. The information is used to determine when to begin or when to expedite the preparing of the ordered goods and/or services and/or when to begin or when to expedite their delivery to a specific parking spot (a specific one of substantially adjacent plural polygonal areas).

Entry for first-time use of the method 400 may occur at 405, whereas later entry may occur at 415. In step 410 a user downloads into his/her normally used personal mobile device (e.g., smartphone 215', 315, or a smartwatch or another normally or routinely carried and/or worn personal wireless device) an order or request submitting and progress advisement application (app) that is configured for placing orders or requests to one or more prespecified vendors and/or vendor venues (e.g., fast food establishments, sit-down restaurants, big box store item pickup areas) and for then providing an identified recipient with progress information such as when, where and how to receive the requested goods and/or services. The downloaded app may include an installable background peripheral service that causes the mobile device to periodically and/or on-demand output GbLI-signals when approaching the vendor premises and/or while parked there or nearby (e.g., in an adjacent parking lot or garage). It is within the contemplation of the present disclosure that the order or request submitting portion and the progress advisement portion are provided as two or more separate programs rather than one combined app. The order or request submitting and progress advisement application (app) may be downloaded via the Internet and from one or more vendor-specified websites. In one embodiment, the order or request submitting app may first be downloaded into a desktop or laptop computer of a user and used for ordering where after the progress advisement portion is transferred into a personal mobile device (e.g., 315) of an identified recipient (could be same as the order placer) for execution in that personal mobile device (e.g., 315).

In a subsequent step 420, the user launches the app as a foreground executed process on his/her normally used personal mobile device (e.g., smartphone 315) and, in one embodiment, uses the personal mobile device to order or request various goods and/or services for provisioning at one or more app-compatible vendor venues in accordance with order-placing guidances provided by the app. Typically, the app will cooperate with an in-cloud server and obtain an identification of the user and an identification of a time range in which the user expects provisioning of the ordered goods and/or services to occur. In an alternate embodiment, the user places the order at the venue by way of venue-provided ordering mechanism (e.g., a drive-up microphone into which the user speaks). Once the ordering details are completed and associated with the identification information to be include in the GbLI-signals to be output by the user's personal mobile device, the app also establishes within the user's personal mobile device one or more background peripheral services (BPSs) which may be dynamically connected to by external devices (e.g., the scanners 127a-127n at or near the vendor's venue). When one of these established BPSs is connected to, and it temporarily awakens, transmits a GbLI-signal containing the identification that has been assigned to the order and then goes back to sleep. The temporarily awakened BPS does not block the user from accessing foreground applications or services on his/her personal mobile device and does not consume significant battery power. Steps 410 and 420 may be carried out in the user's transport vehicle, home, office or elsewhere as convenient. They need not occur while the user is present in the vendor's scanners-covered establishment. In one embodiment, a second of the BPSs causes the user's mobile device to relay to a vendor accessible server (e.g., 340b), current location information of the mobile device as determined based on connection to cellular telephony equipment and/or GPS-based position determining equipment.

In step 422 the user (U1) arrives at the establishment and enters a scanners-covered area of the vendor's establishment while carrying his/her normally used mobile device (e.g., smart phone 215'). For one class of embodiments (e.g., Apple iPhones™) the operating system (OS) of the mobile device automatically detects presence of external Bluetooth™ devices and occasionally broadcasts its own Bluetooth™ signals to thereby autonomously advertise its presence in the area and declare a current hardware address code (HAC) by way of which the personal device may be addressed. In one embodiment, the presence advertising operation is intercepted before broadcast and modified to include GPS-based position reporting information.

In step 424 an appropriate receiver (e.g., one of scanners 127a-127n) detects the reported GbLI-signals and checks a local database to determine if the included customer and/or transaction identification is already recorded in an area of the database so that additional customer and/or transaction related information can be pulled up.

Also in step 424, the detected GbLI-signals are used to track the trajectory of the user's vehicle (e.g., 114") as it approaches (e.g., on public street 160) a corresponding pickup spot or parking lot, garage or other like structure 140. The collected information is sored in a database and analyzed to determine if order preparation and/or delivery needs to be begun or expedited.

Step 430 represents the use of one or more GPS-based reported locations and the respective CoMPTL's circle or other geometric figure bounding the MPTL's for those reported locations to thereby determine what parking spots or other pre-mapped polygonal areas the vehicle is moving adjacent to and to thereby estimate the vehicle's current trajectory and speed. The determined presence and trajectory of the user's personal mobile device are reported to an order management system. In one embodiment, the order management system tracks movements of the user and/or his/her personal mobile device so as to determine whether the user has settled at a relatively stable parking spot (e.g., 242') and what the coordinates of that location are or whether the user is advancing towards such a quick pickup spot. The order management system may then dispatch instructions to appropriate human and/or robotic service providers to advance or delay the preparation and/or production of the requested goods and/or services so that provisioning of the goods/services timely intersects with the determined or predicted location of the recipient in accordance with a current provisioning plan.

Step 431 determines whether the customer's vehicle has finally stopped in a parking spot or other pickup spot or whether the customer is still driving around looking for such a spot. If still driving, control returns to step 430. If speed drops below a predetermined minimum for more than a predetermined time duration, control advance to step 432.

Figure 5:
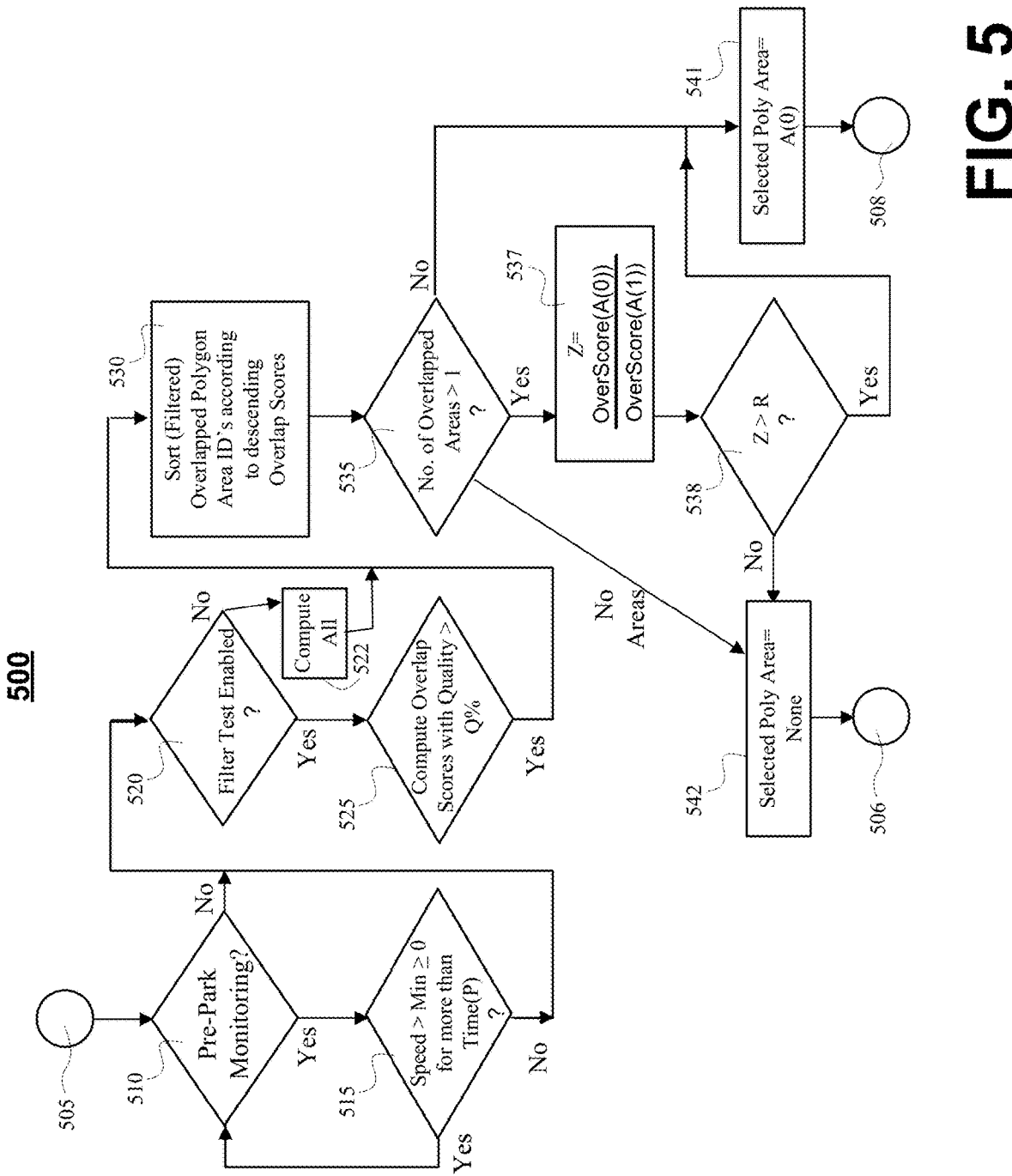
FIG. 5 is a flow chart of a machine-implemented method for reporting out either a best candidate among plural polygonal areas or that no polygonal area can currently be reliably reported as being occupied by a specific GPS position reporting device whose GbLI-signals are being considered.

In step 440, the final parking spot or other pickup spot is determined using the overlap scores developed from the overlaying of a mapping of the reported location onto a mapping of the potential pickup/parking spots and the generation of the CoMPTL's circle or other such MPTL's-bounding figure on the mapping. A number of different algorithms may be used for determining the best one or best handful of answers. One such algorithm is depicted in FIG. 5. In one embodiment, prior trajectory data is used to refine the answer or answer as indicated in step 441. While the parked customer is waiting for delivery of the ordered goods/services to the determined parking spot or other pickup spot, the customer may access and use one or more foreground apps and/or services of his/her personal mobile device (as indicated by steps 450-460) while not interfering with the occasional and temporary reawakening's of the GbLIS-transmitting background peripheral service (BPS). The user-accessible one or more foreground apps and/or services may include games, web browsers, email applications, social media applications and so forth. The user therefore can be entertained or may conduct work tasks while waiting for delivery of the requested goods and/or services. One of the foreground apps and/or services may be the order progress advisement app which advises the user about the progress of, and/or currently planned time, location and method of providing the requested goods and/or services to that user.

Step 442 represents the relaying of the decision(s) about the parked spot of the customer to one or more attendants (e.g., those in area 132) of the establishment who are assigned to deliver ordered goods/services to their respective destinations. As mentioned, while the customer waits for the delivery (completed at step 461), the customer may use his/her mobile device 215' for other purposes.

In one embodiment, after the requested goods and/or services have been satisfactorily provided to the tracked user (step 461), the user tracking BPSs are automatically deleted from the user's personal mobile device and the transaction TID is automatically deleted from the local database. This deletion step assures that the BPSs and TID are ephemeral objects which disappear after the order has been fulfilled. As a result, the user's privacy is secured in that the details of the delivered order can no longer be found using the temporarily assigned TID.

FIG. 5 depicts a machine-implemented algorithm 500 for selectively choosing the polygonal area that most likely contains the GPS position reporting device (e.g., 215'). Entry is made at 505 with a respective device ID and reported location (e.g., 217) already in hand. At step 510 it is determined whether pre-parking monitoring should be conducted. The answer may depend on current processor workload and available data processing bandwidth. If no, control is advanced to step 520.

If the answer to test step 510 is yes, control advances to a pre-park subroutine that includes step 515. The pre-park subroutine (not all shown) automatically repeatedly extracts the velocity reports from the received GbLI-signals as well as the GPS-based location reports. A rough estimate of the vehicle's trajectory is determined and stored. In step 515 it is determined whether the vehicle has reached its intended polygonal area (e.g., parking spot) and is either in the final act of cautiously parking or it has already stopped an is parked. The testing includes determining if current speed is below a predetermined minimum or is at zero for more than a negligible pause time. The predetermined minimum can be 5 MPH or less. The pause time P can be in the range of about 5 to 15 seconds. Pause time P may be a function of context, for example how long the typical stop time is at lane crossings and how crowded is the parking lot, garage or other like structure (e.g., 140). If the answer to test step 510 is Yes, control returns to step 510.

On the other hand, if the answer to test step 510 is No, (speed is not greater than the minimum or zero) control advances to a first filtering routine. In step 510 it is determined whether the first filtering routine is enabled or not. The answer may be a function of context, for example, how much ambient noise is present such that the first filtering is desirable. If no filtering is warranted, the overlap scores for all overlapped polygonal areas are computed and kept (stored into to be sorted list) in step 522.

On the other hand, if the answer to test step 520 is Yes (the first filtering is desired), control advances to step 525 in which the respective computed overlap scores for the respective overlapped polygonal areas are tested for quality Q before being kept. In one embodiment, the quality Q test requires that the overlap score be above a predetermined fraction (e.g., 25%) of the maximum overlap score obtainable for that polygonal area. In the same or another embodiment, the quality Q test requires that the overlap area be above a predetermined fraction (e.g., 20%-40%) of the total area of the overlapped polygonal area. Overlaps that fail the quality Q test are discarded rather than being appended to the tail of a sortable list (e.g., an array having polygonal area identifying slots A(0), A(1), A(2), etc. and associated overlap score slots OS(0), OS(1), OS(2), etc.).

In step 530 the completed list of overlapped area identifications and associated overlap score are sorted according to overlap score with the highest score being in slot OS(0) and the identification of the polygonal area receiving the highest score being in slot A(0). If the number of overlap scores is just one due to the first quality test, step 535 advances control to step 541.

On the other hand, if it is determined in step 535 that the array is empty (no qualifying overlap areas or qualifying overlap scores were found), control advance to step 542.

As a third option, if more than 1 overlapped area remain in the array, a further quality test is conducted in steps 537-538. In step 537, a distinction factor (e.g., Z) is determined as a function of the ratio of the overlap score for the area identified in the top slot A(0) and the overlap score for the area identified in the next lower slot A(1). Test step 538 compares the distinction factor against a predetermined distinction requirement R. In one embodiment, R is in the range of about 1.5 to 2.5 and test step 538 requires that Z be greater than R. If not true (No), control advances to step 542 in which it is reported that currently it is indeterminable as to which polygonal area (e.g., parking spot) contains the subject GPS position reporting device (e.g., 215'). An exit is made at step 506.

On the other hand, if test step 538 determines that the distinction requirement R is met (Yes) control advances to step 541 in which it is reported that currently the polygonal area (e.g., parking spot) identified in slot A(0) contains the subject GPS position reporting device (e.g., 215'). An exit is made at step 508.

In accordance with various embodiments of the present disclosure, the methods described herein may be implemented using one or more hardware computer systems that execute software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a digital processor of a digital programmable computer or other programmable data processing apparatus to produce a machine, such that the instructions, which execute via the processor of the computer or other programmable instruction execution apparatus, create a mechanism for implementing the functions/acts specified in the flowchart and/or block diagram block or blocks. All instructions need not be executed a by same one processor and can instead be distributed among a plurality of operatively cooperative processors. The terminology, 'at least one processor' as used herein is to be understood as covering both options, namely having one processor execute the all instructions or distributing the instructions for execution by two or more processors.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously or on an interrupted multi-tasking basis and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claimed subject matter.

What is claimed is:

1. A method comprising:

receiving a signal from a position reporting device, wherein the position reporting device includes a mobile computing device and the signal is based on a GPS signal received by the mobile computing device;

determining, based at least in part on the signal, a reported location;

determining a position of the reported location relative to a map, wherein the map comprises substantially adjacent polygonal areas associated with an establishment;

generating, based at least in part on the position of the reported location and at least one more probable true location (MPTL) representing possible locations for the position reporting device, a geometric figure on the map that encompasses the reported location on the map;

determining a size of the geometric figure based at least in part on noise data associated with the signal;

determining an overlap of the geometric figure with a region of the substantially adjacent polygonal areas;

determining an overlap score based on the overlap between the geometric figure and the region, wherein the overlap score is indicative of the region corresponding to the MPTL; and determining, based on the overlap score, at least one of:
   a first time associated with preparing an ordered good or service; or
   a second time associated with expediting delivery of the ordered good or service to a specific location.

2. The method of claim 1, further comprising:

filtering candidate locations of the position reporting device based on comparing the overlap score to a threshold overlap score.

3. The method of claim 1, further comprising:

determining the reported location based at least in part on at least one of:

velocity information associated with the position reporting device;

acceleration information associated with the position reporting device; or trajectory information associated with the position reporting device.

4. The method of claim 1, wherein the region of the substantially adjacent polygonal areas comprises information indicating whether the region represents a parking space and whether the parking space comprises a special privilege parking space.

5. The method of claim 1, wherein:

an attendant assigned to service the establishment is tasked with delivering to that region, pre-specified goods within a pre-specified time duration.

6. A system comprising:

one or more processors; and one or more non-transitory computer readable media storing computer executable instructions that, when executed, cause the one or more processors to perform operations comprising:

receiving a signal from a position reporting device, wherein the position reporting device includes a mobile computing device and the signal is based on a GPS signal received by the mobile computing device;

determining, based at least in part on the signal, a reported location;

determining a position of the reported location relative to a map, wherein the map comprises substantially adjacent polygonal areas associated with an establishment;

generating, based at least in part on the position of the reported location and at least one more probable true location (MPTL) representing possible locations for the position reporting device, a geometric figure on the map that encompasses the reported location on the map;

determining a size of the geometric figure based at least in part on noise data associated with the signal;

determining an overlap of the geometric figure with a region of the substantially adjacent polygonal areas;

determining an overlap score based on the overlap between the geometric figure and the region, wherein the overlap score is indicative of the region corresponding to the MPTL; and determining, based on the overlap score, at least one of:

a first time associated with preparing an ordered good or service; or a second time associated with expediting delivery of the ordered good or service to a specific location.

7. The system of claim 6, the operations further comprising:

filtering candidate locations of the position reporting device based on comparing the overlap score to a threshold overlap score.

8. The system of claim 6, the operations further comprising:

determining the reported location based at least in part on at least one of:

velocity information associated with the position reporting device;

acceleration information associated with the position reporting device; or trajectory information associated with the position reporting device.

9. The system of claim 6, wherein the region of the substantially adjacent polygonal areas comprises information indicating whether the region represents a parking space and whether the parking space comprises a special privilege parking space.

10. The system of claim 6, wherein:

an attendant assigned to service the establishment is tasked with delivering to that region, pre-specified goods within a pre-specified time duration.

11. One or more non-transitory computer readable media storing computer executable instructions that, when executed, cause one or more processors to perform operations comprising:

receiving a signal from a position reporting device, wherein the position reporting device includes a mobile computing device and the signal is based on a GPS signal received by the mobile computing device;

determining, based at least in part on the signal, a reported location;

determining a position of the reported location relative to a map, wherein the map comprises substantially adjacent polygonal areas associated with an establishment;

generating, based at least in part on the position of the reported location and at least one more probable true location (MPTL) representing possible locations for the position reporting device, a geometric figure on the map that encompasses the reported location on the map;

determining a size of the geometric figure based at least in part on noise data associated with the signal;

determining an overlap of the geometric figure with a region of the substantially adjacent polygonal areas;

determining an overlap score based on the overlap between the geometric figure and the region, wherein the overlap score is indicative of the region corresponding to the MPTL; and determining, based on the overlap score, at least one of:

a first time associated with preparing an ordered good or service; or a second time associated with expediting delivery of the ordered good or service to a specific location.

12. The one or more non-transitory computer readable media of claim 11, the operations further comprising:

filtering candidate locations of the position reporting device based on comparing the overlap score to a threshold overlap score.

13. The one or more non-transitory computer readable media of claim 11, the operations further comprising:

determining the reported location based at least in part on at least one of:

velocity information associated with the position reporting device;

acceleration information associated with the position reporting device; or trajectory information associated with the position reporting device.

14. The one or more non-transitory computer readable media of claim 11, wherein the region of the substantially adjacent polygonal areas comprises information indicating whether the region represents a parking space and whether the parking space comprises a special privilege parking space.

15. The method of claim 1, wherein the size of the geometric figure is further based at least in part on at least one of a time of day or a day of a year.

16. The method of claim 1, wherein the geometric figure is subdivided into at least a first portion and a second portion.

17. The method of claim 16, wherein the first portion is associated with a first weighted value and the second portion is associated with a second weighted value.

18. The method of claim 1, wherein the geometric figure and the region include at least a first overlap area and a second overlap area of multiple overlap areas.

19. The method of claim 18, further comprising generating a list of the multiple overlap areas based at least in part on a calculated overlap score for each individual multiple overlap areas.

20. The method of claim 19, further comprising determining that at least one overlap score associated with at least one overlap area is less than a predetermined value and automatically deleting the at least one overlap area from the list.

\*   \*   \*   \*   \*